United States Patent
Pigg et al.

[19]

[11] Patent Number: 5,829,536
[45] Date of Patent: Nov. 3, 1998

[54] MANUALLY PIVOTABLE PLOW USING A RATCHET WHEEL AND LEVER CONNECTED TO A TIEBAR ASSEMBLY TO VERTICALLY ADJUST A SOIL CULTIVATING TOOL

[75] Inventors: Donald E. Pigg; Helen E. Pigg, both of Lubbock, Tex.

[73] Assignee: Weekend Warrior, Inc., Lubbock, Tex.

[21] Appl. No.: 917,920

[22] Filed: Aug. 27, 1997

[51] Int. Cl.⁶ ................................................. A01B 63/00
[52] U.S. Cl. ........................ 172/482; 172/452; 171/141
[58] Field of Search .......................... 172/47, 238, 240, 172/452, 482, 260, 272, 395, 583, 322; 171/141; 414/680

[56] References Cited

U.S. PATENT DOCUMENTS

| 193,297 | 7/1877 | Thompson et al. . | |
|---|---|---|---|
| 418,828 | 1/1890 | Titus . | |
| 1,219,880 | 3/1917 | Strode | 172/452 |
| 1,503,903 | 8/1924 | Leibold | 172/452 |
| 1,651,068 | 11/1927 | Nitardy | 172/482 |
| 1,813,511 | 7/1931 | Reynolds . | |
| 2,044,262 | 6/1936 | Stevenson | 172/452 |
| 2,228,530 | 1/1941 | Mott | 172/452 |
| 2,286,312 | 6/1942 | Scarlett et al. | 172/452 |
| 2,884,081 | 4/1959 | Weber | 172/482 |
| 3,570,605 | 3/1971 | Rikli . | |
| 3,749,179 | 7/1973 | Hartman . | |
| 4,466,492 | 8/1984 | Steinberg | 172/551 |
| 5,054,151 | 10/1991 | Estes, Sr. | 172/359 X |

FOREIGN PATENT DOCUMENTS

| 106458 | 2/1939 | Australia | 172/452 |
|---|---|---|---|
| 16954 | 1/1913 | Denmark | 172/152 |

*Primary Examiner*—Terry Lee Melius
*Assistant Examiner*—Victor Batson
*Attorney, Agent, or Firm*—Stephen R. Greiner

[57] ABSTRACT

A plow having a wheeled frame for towing by a land vehicle. The plow includes a tool carrier pivotally secured to the frame for carrying soil cultivating tools. A ratchet wheel and a lever are pivotally secured to the frame in a side-by-side relationship. A drive pawl is pivotally secured to the lever for pivoting the ratchet wheel in one direction when the lever is pivoted. A holding pawl is pivotally secured to the frame for permitting the rotation of the ratchet wheel with the lever in one direction but preventing the rotation of the ratchet wheel in the opposite direction. A tiebar assembly, having a rocker arm and a lifting arm, is pivotally secured to the frame. A link connects the lifting arm to the tool carrier. A pushrod connects the ratchet wheel to the rocker arm. By manually pivoting the lever, the user of the plow can easily raise and lower soil cultivating tools with an accompanying mechanical advantage.

6 Claims, 3 Drawing Sheets

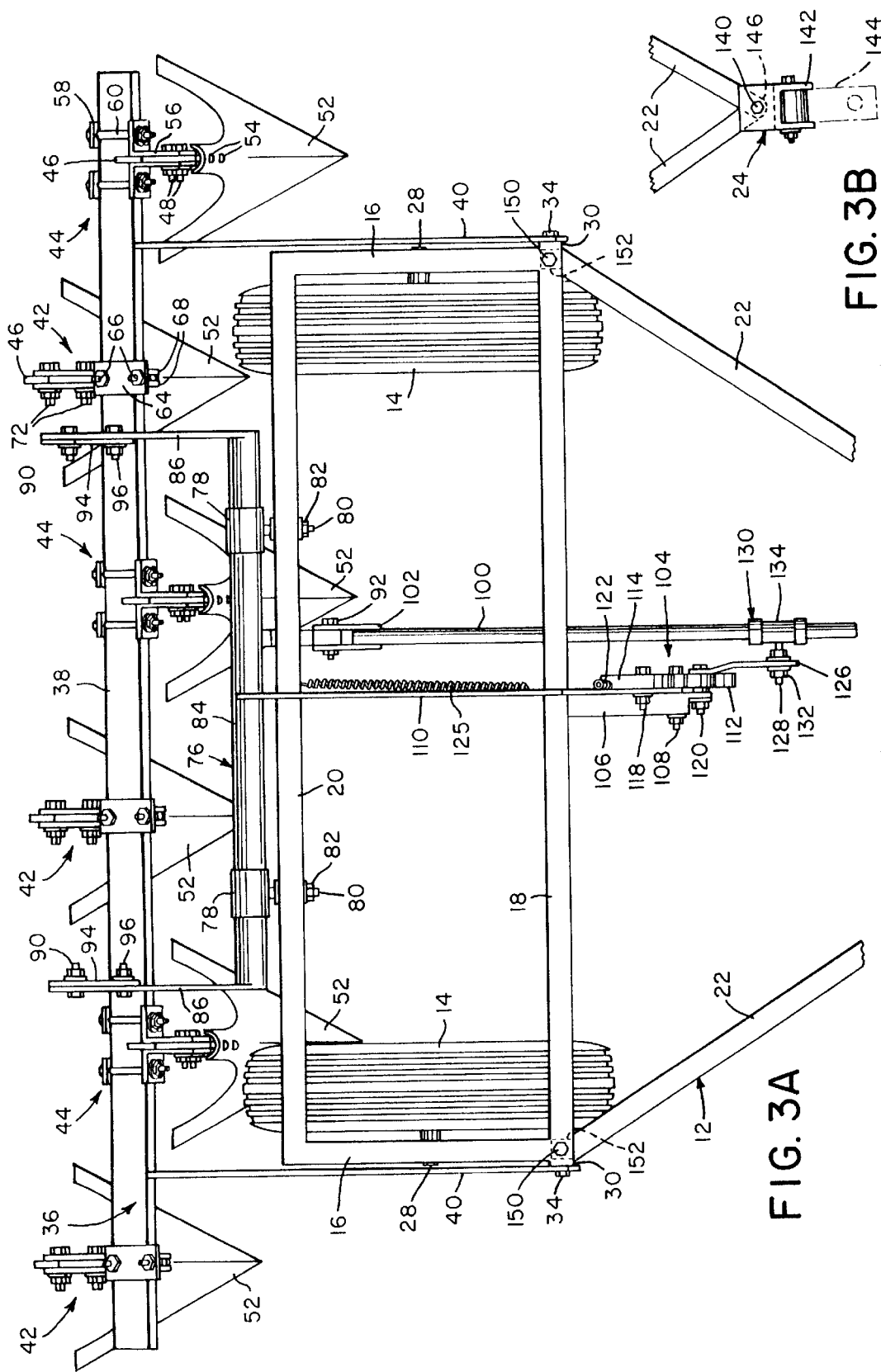

MANUALLY PIVOTABLE PLOW USING A RATCHET WHEEL AND LEVER CONNECTED TO A TIEBAR ASSEMBLY TO VERTICALLY ADJUST A SOIL CULTIVATING TOOL

FIELD OF THE INVENTION

The present invention relates generally to earth working apparatus and, in particular, to a plow having an actuator for the vertical adjustment of a tool with respect to a wheeled frame.

BACKGROUND OF THE INVENTION

Many gardeners who tend relatively large plots of land are faced with a quandary: should they purchase a cultivator for breaking up the soil and forming furrows in preparation for sowing or should they continue to perform these difficult tasks by hand? As is well-known, conventional cultivators are large, complex and costly machines. Because of their bulk, they are neither easy to maneuver nor easy to store out of the weather after use. On the other hand, human frailty places limits on the amount of manual soil preparation work that a gardener can perform and, thus, tends to greatly limit the size of a garden.

SUMMARY OF THE INVENTION

In light of the problems associated with conventional cultivators, it is a principal object of the invention to provide a plow which is compact in size, can be easily maneuvered around structures where conventional cultivators are ineffective and, after use, can be readily disassembled for shipping and storage.

It is another object of the invention to provide a plow which can be universally attached to a towing vehicle such as a riding lawn mower, garden tractor or ATV and can be easily operated by the driver of the towing vehicle while the towing vehicle is in motion.

It is a further object of the invention to provide a plow which permits the user to variably raise and lower its associated earth working tools without resorting to complex and costly electric or hydraulic lifting means.

It is an object of the invention to provide improved elements and arrangements thereof in a plow for the purposes described which is lightweight in construction, inexpensive in manufacture, and fully dependable in use.

Briefly, the plow in accordance with this invention achieves the intended objects by featuring a tool carrier pivotally secured to a wheeled frame. A ratchet wheel and a lever are pivotally secured to the frame in a side-by-side relationship. A drive pawl is pivotally secured to the lever for pivoting the ratchet wheel in one direction when the lever is pivoted. A holding pawl is pivotally secured to the frame for permitting the rotation of the ratchet wheel with the lever in one direction but preventing the rotation of the ratchet wheel in the opposite direction. A tiebar assembly, having a rocker and lifting arms, is pivotally secured to the frame. A link connects the lifting arm to the tool carrier. A pushrod connects the ratchet wheel with the rocker arm. By manually pivoting the lever, the user of the plow can easily raise and lower soil cultivating tools with an accompanying mechanical advantage.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 3A is a top plan view of the rearward portion of the plow.

FIG. 3B is a top plan view of the forward portion of the plow.

Similar reference characters denote corresponding features consistently throughout the accompanying drawings.

DETAILED DESCRIPTION OF THE PREFERRED EMBODIMENT

Figure 1:
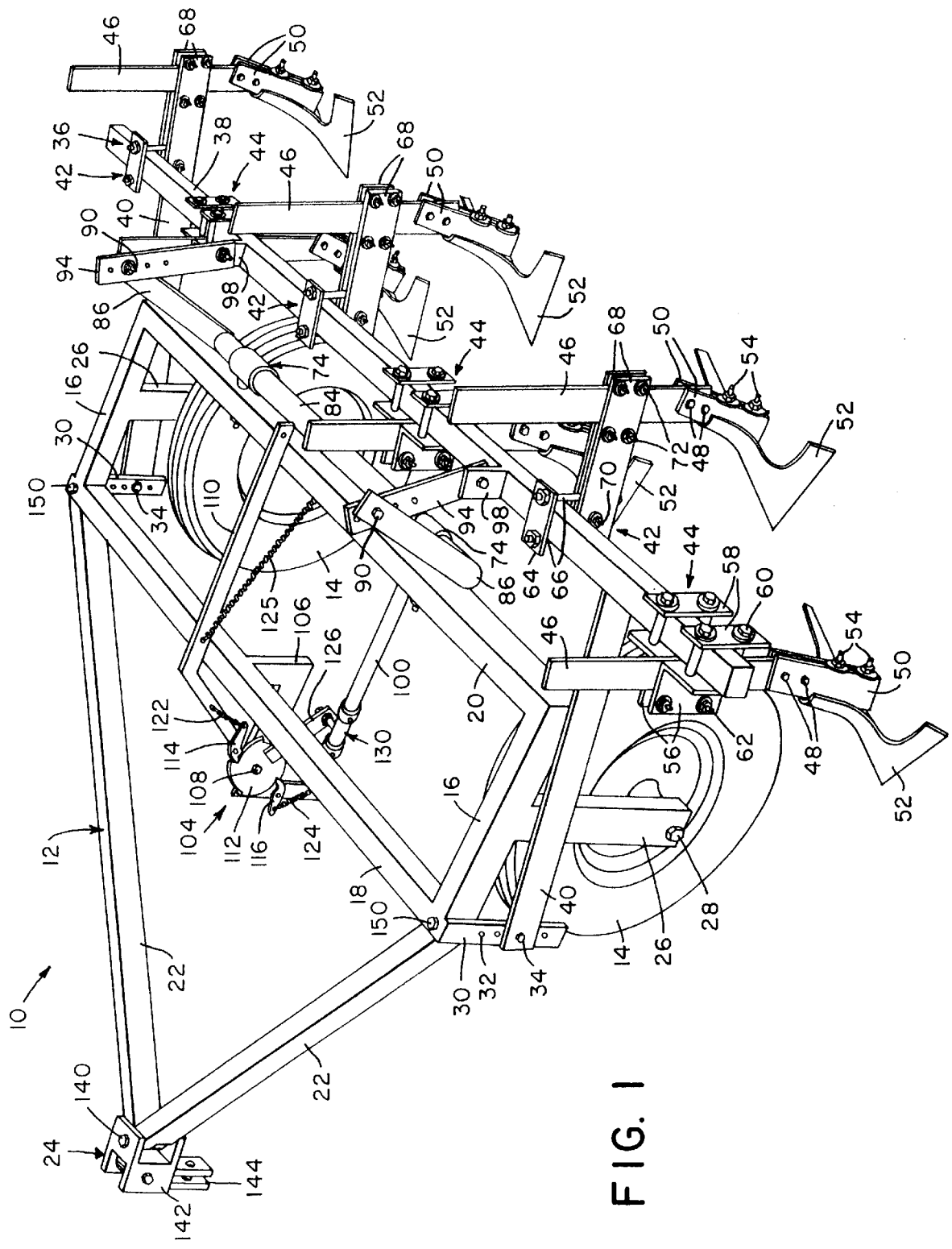
FIG. 1 is a perspective view of a plow in accordance with the present invention.

Referring now to the FIGS., a plow in accordance with the present invention is shown at 10. The plow 10 includes a frame 12 constructed of channel members and supported by wheels 14 on each of its sides. Preferably, the frame 12 has a pair of parallel longitudinal bars 16 which are connected at their respective forward and rearward ends by crossbars 18 and 20. Secured to the forward ends of the longitudinal bars 16 are a pair of forwardly and inwardly extending draft bars 22, the distal ends of which are joined together and to a universal trailer hitch 24. Secured at right angles to the bottom surfaces of the longitudinal bars 16 between the crossbars 18 and 20, however, are a pair of downwardly extending struts 26 having apertures formed through their lower portions for receiving stub shafts 28 upon which the wheels 14 rotate.

A pair of bracket arms 30 are secured to the sides of the longitudinal bars 16 adjacent the ends of the forward crossbar 18. As shown, the bracket arms 30 extend downwardly from the longitudinal bars 16 parallel to the struts 26. The lower portions of the bracket arms 30 are each provided with a number of apertures 32. Threaded fasteners 34 are extended through the apertures 32 to pivotally secure a generally U-shaped tool carrier 36 to the frame 12.

The tool carrier 36 includes a drawbar 38 which is positioned rearwardly of, and parallel to, the rearward crossbar 20 of the frame 12. Secured to the opposed end portions of the drawbar 38 are a pair of forwardly extending guide arms 40. The guide arms 40 have apertures formed at their forward ends which are adapted for registry with the apertures 32 formed in the bracket arms 30 and the receipt of the threaded fasteners 34 to provide pivoted connections between the arms 30 and 40.

Secured by repositionable clamps 42 and 44 spaced along the length of the drawbar 38 are a number of shank brackets 46. The clamps 42 and 44 permit vertical adjustment of the shank brackets 46 which may be seen to extend both upwardly and downwardly from the drawbar 38. By means of threaded fasteners 48, a pair of tool shanks 50 are secured to the opposite sides of each shank bracket 46 at the bottom thereof. To each pair of shanks 50 can be secured one of several types of tools, like the sweeps 52 shown in the FIGS. or any of the well-known chisels or knives, adapted for attachment to shanks of the type described by means of threaded fasteners 54.

The clamps 44 retain several of the shank brackets 46 against the drawbar 38 whereas the clamps 42 hold the remaining shank brackets at a distance from the drawbar for a staggered plowing effect. Each of the clamps 44 includes a pair of L-shaped members 56 positioned against the forward surface of the drawbar 38 and spaced from one another so as to snugly receive a shank bracket 46 therebetween. A pair of planar members 58 are positioned against the rearward surface of the drawbar 38 opposite the L-shaped members 56.

The members 56 and 58 each have apertures formed through their respective upper and lower ends through which threaded fasteners 60 are positioned to secure the opposed members 56 and 58 together and to the drawbar 38. Likewise, the forward portion of each of the L-shaped members 56 is provided with a pair of apertures for receiving threaded fasteners 62. When tightened, the fasteners 62 draw the L-shaped members 56 against the sides of a shank bracket 46 so as to affix such to the drawbar 38.

Each of the clamps 42 includes a planar member 64 positioned against the upper surface of the drawbar 38. The member 64 has apertures formed through its ends for suspending threaded fasteners 66, having diameters equal to the widths of the shank brackets 46, against the forward and rearward sides of the drawbar 38. The lower ends of the threaded fasteners 66 are held by the member 64 at a predetermined distance below the drawbar 38.

The forward portions of a pair of extension plates 68 are positioned on opposite sides of the threaded fasteners 66 and are secured thereto by means of threaded fasteners 70 extending through registered apertures in the forward portions of the extension plates 68. Additional apertures are provided in the rearward portions of the extension plates 68 for receiving two pairs of threaded fasteners 72 between which a shank bracket 46 is positioned. When tightened, the fasteners 72 draw the plates 68 against the sides of a shank bracket 46 and affix such to the drawbar 38.

A pair of hanger brackets 74 are secured in a spaced apart relationship to the crossbar 20 for pivotally connecting a tiebar assembly 76 to the frame 12. The brackets 74 include a pair of tubular sleeves 78 whose longitudinal axes are oriented parallel to the crossbar 20. Extending forwardly from the tubular sleeves 78 are threaded rods 80 adapted to extend through suitably positioned apertures in the crossbar 20. By means of fastening nuts 82, threadably engaged with the threaded rods 80, the sleeves 78 are rigidly secured to the crossbar 20.

The tiebar assembly 76 includes a cylindrical tiebar 84 which extends between the brackets 74 with the opposed end portions thereof extending loosely through the sleeves 78. A pair of rearwardly extending lifting arms 86 are secured to the opposed ends of the tiebar 84. Secured to the center of the tiebar 84, however, is a downwardly extending rocker arm 88. The arms 86 and 88 have apertures formed through their respective distal ends for the receipt of threaded fasteners 90 and 92.

The upper ends of the drawbar links 94 have apertures formed therethrough for registry with the apertures formed through the distal ends of the lifting arms 86 and for the receipt of the threaded fasteners 90 to provide pivoted connections between the lifting arms 86 and drawbar links 94. An aperture is formed through the lower end of each of the drawbar links 94 and through which threaded fasteners 96 extend.

A pair of flanges 98 are secured to the upper surface of the drawbar 38 in substantial alignment with the lifting arms 86 at the ends of the tie bar 84. The flanges 98 have apertures formed therethrough for registry with the apertures formed through the lower ends of the drawbar links 94 and for the receipt of the threaded fasteners 96 to provide pivoted connections between the drawbar links 94 and the flanges 98.

The pushrod 100 has a yoke 102 provided at its rearward end which is adapted to receive the lower end portion of the rocker arm 88. The yoke 102 has apertures formed therethrough for registry with the aperture in the rocker arm 88 and for the receipt of the threaded fastener 92 so as to provide a pivoted connection between the push rod 100 and the rocker arm 88.

The push rod 100 extends forwardly from the lower end of the rocker arm 88 to a ratchet mechanism 104 which is suspended from the forward crossbar 18 by a Z-shaped bracket 106. The ratchet mechanism 104 includes a threaded fastener 108 which extends through an aperture in the middle leg of the bracket 106. The fastener 108 serves as an axle for the independent rotation of a lever 110 and a ratchet wheel 112 mounted face-to-face on one side thereof.

Figure 2:
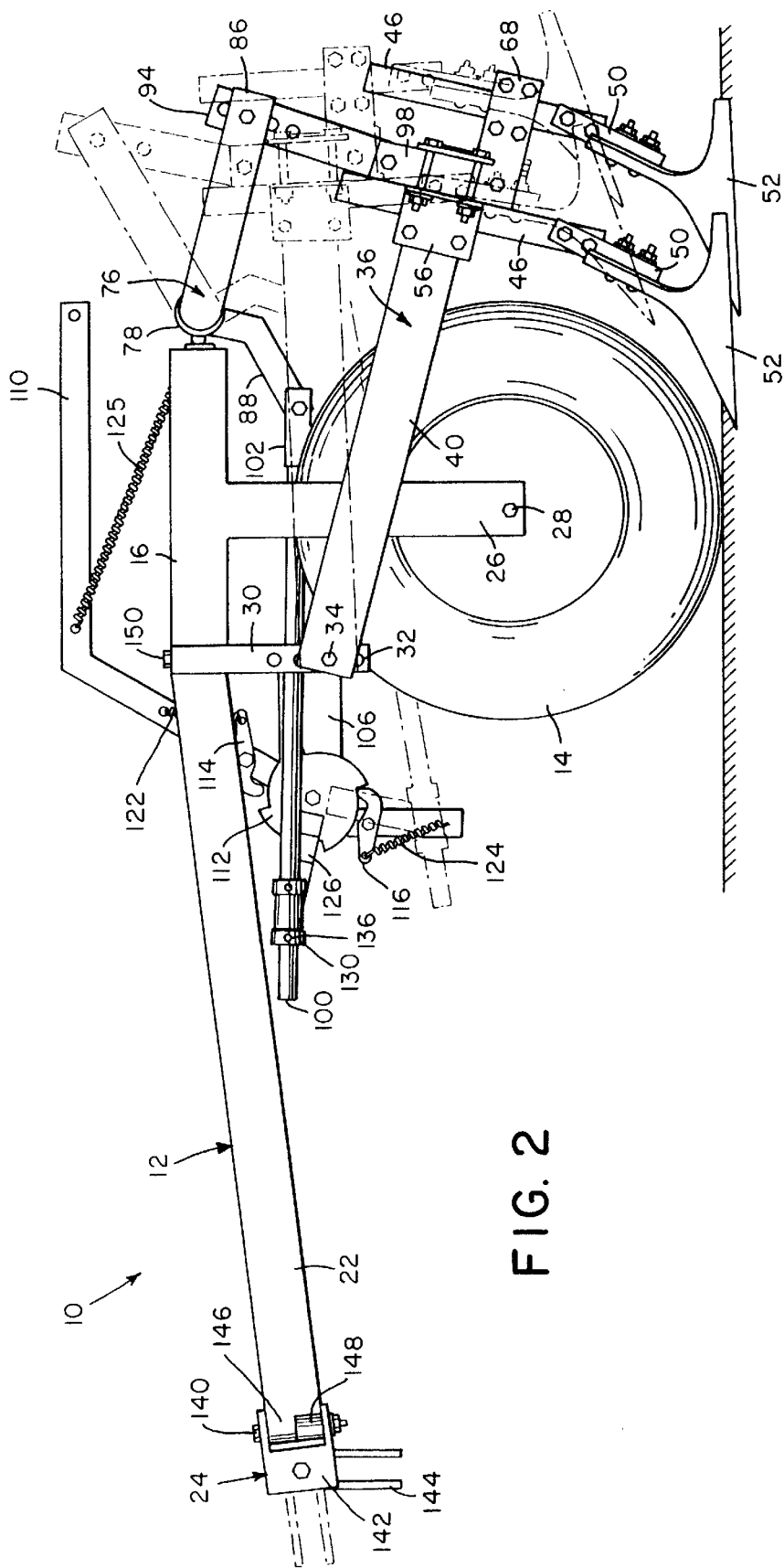
FIG. 2 is a side elevational view of the plow of FIG. 1.

A drive pawl 114 and a holding pawl 116 provide the ratchet mechanism 104 with a locking action that limits the rotation of the ratchet wheel 112 to only one direction of travel (counterclockwise in FIG. 2). The drive pawl 114 is pivotally secured to the lower portion of the lever 110 by means of a threaded fastener 118. The holding pawl 116, on the other hand, is pivotally secured to the lowermost leg of the bracket 106 by another threaded fastener 120.

Tensioned springs 122 and 124 retain portions of the pawls 114 and 116 against the ratchet wheel 112. In particular, the spring 122 joins the tail of the pawl 114 to the upper portion of the lever 110 and holds the head of the pawl 114 against the sloping peripheral teeth on top of the ratchet wheel 112. The spring 124, similarly, joins the tail of the pawl 116 with the lower portion of the lowermost leg of the bracket 106 and holds the head of the pawl 116 against the sloping peripheral teeth on the bottom of the ratchet wheel 112. Another spring 125 connects the lever 110 with the crossbar 20 to hold the lever in a lowered "ready" position.

A drive arm 126 is secured to the side of the ratchet wheel 112 opposite that facing the lever 110 and extends radially outward from the center thereof. The free end of the drive arm 126 is provided with an aperture for rotatably receiving the threaded stem 128 of the pushrod connector 130. Nuts 132 threaded onto the stem portion 128 on opposite sides of the drive arm 126 limit the lateral play in the rotatable connection between the stem 128 and the drive arm 126.

The push rod connector 130 has a tubular portion 134 secured to the stem 128 for receiving therein the forward portion of the pushrod 100. Allen head screws 136 are positioned in threaded apertures in the forward and rearward ends of the tubular portion 134 to selectively lock the forward portion of the pushrod 100 within the tubular portion 134. By means of the screws 136, the effective length of the pushrod 100 may be varied to finely adjust the vertical travel of the carrier assembly 36 and its attached earth-penetrating tools 52.

Use of the plow 10 is uncomplicated. The trailer hitch 24 is first connected to a towing vehicle in the normal manner. Next, assuming the sweeps 52 are engaged with the earth as shown by solid lines in FIG. 2, the sweeps are elevated to the broken line position of FIG. 2 by pulling upwardly and forwardly on the lever 110 to advance the ratchet wheel 112. (Such a task may be easily accomplished from the seat of a garden tractor or ATV by pulling upon a short cord (not shown) attached to the rearward end of the lever 110.) Advancement of the ratchet wheel 112 results in the lifting of the sweeps 52 by cooperative movement of the drive arm 126, pushrod 100, tiebar assembly 76, links 94 and tool carrier 36. The plow 10 may now be towed to a garden plot for earth working activities.

Once at the garden plot, the sweeps 52 are lowered to their original, earth-engaged position by further advancement of the ratchet wheel 112 as described above. The plow 10 may now be towed over the plot to break up soil and cut furrows in preparation for sowing.

The plow 10 may be partially disassembled after use for convenient storage. First, the threaded fastener 140 is withdrawn from the axially aligned apertures in the rearward most one of the pivotally-attached members 142 and 144 of the trailer hitch 24 and the attachment sleeves 146 and 148 located at the forward ends of the draft bars 22. Next, the threaded fasteners 150 are withdrawn from the crossbar 18 and the narrowed, socket portions 152 of the draft bars 22 which are fitted within corresponding apertures in the crossbar 18. Finally, the trailer hitch 24, draft bars 22 and the remainder of the plow 10 may be disconnected from one another and be positioned in a small storage space for later reassembly and use.

While the invention has been described with a high degree of particularity, it will be appreciated by those skilled in the art that numerous modifications may be made thereto. For example, the number of teeth provided on the ratchet wheel 112 can be increased beyond the four shown in the drawings to permit the plow depth of the ground-engaging tools, such as sweeps 52, to be finely varied. Therefore, it is to be understood that the present invention is not limited to the sole embodiment described above, but encompasses any and all embodiments within the scope of the following claims.

We claim:

1. A plow, comprising:

a wheeled frame;

a tool carrier pivotally secured to said frame, said tool carrier being adapted to carry at least one soil cultivating tool;

a ratchet wheel, having opposed sides and a toothed periphery, pivotally secured to said wheeled frame;

a lever pivotally secured to said wheeled frame adjacent said ratchet wheel;

a drive pawl pivotally secured to said lever and adapted for engagement with said toothed periphery of said ratchet wheel so as to pivot said ratchet wheel in one direction when said lever is pivoted;

a holding pawl pivotally secured to said frame and adapted for engagement with said toothed periphery of said ratchet wheel so as to permit the rotation of said ratchet wheel in said one direction and prevent the rotation of said ratchet wheel opposite said one direction;

a tiebar assembly having a rocker arm and a lifting arm, said tiebar assembly being pivotally secured, at a location between said rocker arm and said lifting arm, to said frame;

a link having opposed ends, said link being pivotally secured at one of said opposed ends thereof to said lifting arm of said tiebar assembly and being pivotally secured at the other of said opposed ends to said tool carrier; and, a pushrod having opposed ends, said pushrod being pivotally secured at one of said opposed ends thereof to one side of said ratchet wheel and being pivotally secured at the other of said opposed ends thereof to said rocker arm.

2. The plow according to claim 1 further comprising at least one soil cultivating tool secured to said tool carrier.

3. A plow, comprising:

a frame adapted for towing by a land vehicle, said frame including:

a pair of longitudinal bars having forward and rearward ends;

a pair of struts each respectively extending downwardly from one of said longitudinal bars;

a forward crossbar connecting said forward ends of said longitudinal bars together;

a rearward crossbar connecting said rearward ends of said longitudinal bars together;

a pair of draft bars having front and back ends, each of said draft bars being respectively secured at said back end to said forward end of one of said longitudinal bars, said draft bars being connected together at said front ends thereof; and, a trailer hitch secured to said front ends of said draft bars;

a tool carrier pivotally secured to said frame, said tool carrier including:

a drawbar disposed rearwardly of said rearward crossbar and substantially parallel thereto, said drawbar being adapted to carry a plurality of soil cultivating tools; and, a pair of guide arms having opposed ends, each of said guide arms being respectively secured at one of said opposed ends to said drawbar, each of said guide arms being respectively pivotally secured at the other one of said opposed ends to one of said longitudinal bars;

a tiebar assembly including a rocker arm and a lifting arm, said tiebar assembly being pivotally secured, at a location between said rocker arm and said lifting arm, to said rearward crossbar of said frame;

a link having opposed ends, said link being pivotally secured at one of said opposed ends to said lifting arm of said tiebar assembly and being pivotally secured at the other of said opposed ends to said drawbar of said tool carrier;

a pair of wheels supporting said frame, each of said wheels being respectively secured to one of said struts;

a bracket extending downwardly from said forward crossbar;

a ratchet wheel, having opposed sides and a toothed periphery, pivotally secured to said bracket;

a lever pivotally secured to said bracket adjacent said ratchet wheel;

a drive pawl pivotally secured to said lever and adapted for engagement with said toothed periphery of said ratchet wheel so as to pivot said ratchet wheel in one direction when said lever is pivoted;

a holding pawl pivotally secured to said bracket and adapted for engagement with said toothed periphery of said ratchet wheel so as to permit the rotation of said ratchet wheel in one direction and prevent the rotation of said ratchet wheel opposite said one direction; and, a pushrod having opposed ends, said pushrod being pivotally secured at one of said opposed ends thereof to one side of said ratchet wheel and being pivotally secured at the other of said opposed ends thereof to said rocker arm.

4. The plow according to claim 3 further comprising at least one soil cultivating tool secured to said drawbar.

5. A plow, comprising:

a frame adapted for towing by a land vehicle, said frame including:

a pair of longitudinal bars having forward and rearward ends;

a pair of struts each respectively extending downwardly from one of said longitudinal bars;

a forward crossbar connecting said forward ends of said longitudinal bars together;

a rearward crossbar connecting said rearward ends of said longitudinal bars together;

a pair of draft bars having front and back ends, each of said draft bars being respectively secured at said back end to said forward end of one of said longitudinal bars, said draft bars being connected together at said front ends thereof; and, a trailer hitch secured to said front ends of said draft bars;

a tool carrier pivotally secured to said frame, said tool carrier including:

a drawbar disposed rearwardly of said rearward crossbar and substantially parallel thereto, said drawbar being adapted to carry a plurality of soil cultivating tools; and, a pair of guide arms having opposed ends, each of said guide arms being respectively secured at one of said opposed ends to said drawbar, each of said guide arms being respectively pivotally secured at the other one of said opposed ends to one of said longitudinal bars;

a tiebar assembly including:

a tiebar pivotally secured to said rearward crossbar of said frame, said tiebar having opposite ends;

a rocker arm being secured to said tiebar and extending downwardly therefrom;

a pair of lifting arms each being respectively secured to one of said opposite ends of said tiebar and extending rearwardly therefrom;

a pair of links having opposed ends, each of said links being respectively pivotally secured at one of said opposed ends to one of said lifting arms of said tiebar assembly and each of said links being respectively pivotally secured at the other of said opposed ends to said drawbar of said tool carrier;

a pair of wheels supporting said frame, each of said wheels being respectively secured to one of said struts;

a bracket extending downwardly from said forward crossbar;

a ratchet wheel, having opposed sides and a toothed periphery, pivotally secured to said bracket;

a lever pivotally secured to said bracket adjacent said ratchet wheel;

a drive pawl pivotally secured to said lever and adapted for engagement with said toothed periphery of said ratchet wheel so as to pivot said ratchet wheel in one direction when said lever is pivoted;

a holding pawl pivotally secured to said bracket and adapted for engagement with said toothed periphery of said ratchet wheel so as to permit the rotation of said ratchet wheel in one direction and prevent the rotation of said ratchet wheel opposite said one direction; and, a pushrod having opposed ends, said pushrod being pivotally secured at one of said opposed ends thereof to one side of said ratchet wheel and being pivotally secured at the other of said opposed ends thereof to said rocker arm.

6. The plow according to claim 5 further comprising at least one soil cultivating tool secured to said drawbar.

\* \* \* \* \*